(12) United States Patent
Benner et al.

(10) Patent No.: US 7,164,482 B2
(45) Date of Patent: Jan. 16, 2007

(54) POSITION MEASURING SYSTEM

(75) Inventors: Ulrich Benner, Trostberg (DE); Elmar Mayer, Nussdorf (DE); Wolfgang Holzapfel, Obing (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 287 days.

(21) Appl. No.: 10/840,812

(22) Filed: May 7, 2004

(65) Prior Publication Data

US 2004/0227958 A1    Nov. 18, 2004

(30) Foreign Application Priority Data

May 16, 2003   (DE) ................ 103 23 088

(51) Int. Cl.
*G01B 11/14* (2006.01)
(52) U.S. Cl. ............ 356/620; 250/231.14; 250/231.13; 250/231.16
(58) Field of Classification Search ................ 340/620; 356/620; 210/100; 250/231.14, 237 G, 250/231.13, 231.16, 348
See application file for complete search history.

(56) References Cited

U.S. PATENT DOCUMENTS

| | | | |
|---|---|---|---|
| 4,112,295 A * | 9/1978 | Dubik et al. ............ 250/237 G |
| 4,577,101 A | 3/1986 | Bremer et al. | |
| 4,758,720 A | 7/1988 | Aubele et al. | |
| 4,766,307 A * | 8/1988 | Pelgrom et al. ......... 250/208.3 |
| 5,486,923 A | 1/1996 | Mitchell et al. | |
| 5,886,352 A | 3/1999 | Wright et al. | |
| 6,366,408 B1 | 4/2002 | Kittaka et al. | |
| 6,707,613 B1 | 3/2004 | Fujimoto et al. | |
| 2004/0118758 A1 | 6/2004 | Gordon-Ingram | |

FOREIGN PATENT DOCUMENTS

| | | |
|---|---|---|
| EP | 1 114 983 A1 | 7/2001 |
| EP | 0 801 724 B1 | 1/2002 |
| JP | 2000-221442 | 8/2000 |
| JP | 2001-352429 | 12/2001 |
| JP | 2004-529344 A | 9/2004 |
| WO | WO 02/084223 A1 | 10/2002 |

OTHER PUBLICATIONS

Anderson, R.H., "Close-up imaging of documents and displays with lens arrays," *Applied Optics*, vol. 18, No. 4, Feb. 15, 1979, pp. 477-484.

Shaoulov, Vesselin, et al., "Compact Relay Lenses Using Microlenslet Arrays," *Proc. Of SPIE*, vol. 4832, 2002, pp. 74-79.

* cited by examiner

*Primary Examiner*—Layla Lauchman
*Assistant Examiner*—Tri Ton
(74) *Attorney, Agent, or Firm*—Brinks Hofer Gilson & Lione

(57) ABSTRACT

A position measuring system that includes a scale having a measuring graduation extending along a first line and a scanning device. The scanning device includes a light source that transmits light beams that scan the measuring graduation, wherein the measuring graduation generates modified light from the transmitted light beams and a detector unit that receives the modified light from the measuring graduation. A lens arrangement, arranged between the scale and the detector unit, the lens arrangement generating a defined image of the measuring graduation on the, detector unit, wherein the defined image extends along a second line, whose curvature is different from a curvature of the first line.

58 Claims, 11 Drawing Sheets

POSITION MEASURING SYSTEM

Applicants claim, under 35 U.S.C. §119, the benefit of priority of the filing date of May 16, 2003 of a German patent application, copy attached, Serial Number 103 23 088.2, filed on the aforementioned date, the entire contents of which is incorporated herein by reference.

BACKGROUND OF THE INVENTION

1. Field of the Invention

The present invention relates to a position measuring system, having a material measure or scale with a least one measuring graduation extending along a straight line or a curved line, a scanning device for scanning the measuring graduation with the aid of a light source, a detector unit of the scanning device, by which light beams transmitted from a light source and modified by the measuring graduation can be received for evaluation, and a lens arrangement, arranged between the material measure or scale and the detector unit and constituted by optical lenses, for generating a defined image of the measuring graduation on the detector unit.

2. Discussion of Related Art

Such a position measuring system is used for determining the relative positions of two objects which can be moved with respect to each other, for example two machine elements of a machine tool, which can be moved in relation to each other. For this purpose the scale is connected with one of the two objects, and the scanning device with the other one, so that by scanning the scale by the measuring graduation the amount of movement of the two objects with respect to each other along the extension direction of the measuring graduation (measuring direction) can be determined. Straight line movements of the two objects in relation to each other can be measured with so-called linear position measuring systems, wherein the measuring graduation extends along a straight line, while so-called angle measuring devices are used for determining the relative position of two objects which can be rotated with respect to each other. The measuring graduation can basically extend along any arbitrary line along which the relative movement of two objects which are movable with respect to each other is to be determined.

The different design of the measuring graduation of linear position measuring systems on the one hand, and of position measuring systems for determining a movement along a curved line, on the other, has the result that the detector unit (opto- electronic detector), by which the light beams modified by the measuring graduation (by an incident or a transmitted light method) are received for evaluation must be matched to the geometry of the respective measuring graduation. This applies in particular to the design and grid layout of the radiation-sensitive surface of the detector unit which, as a rule, is constituted by a suitable opto-electronically integrated circuit (opto-ASIC). The employment of different opto-electronic detectors for different geometries results in a corresponding increase of the manufacturing costs.

A position measuring system is known from EP 0 801 724 B1, in which an analyzer grating is arranged between the measuring graduation to be scanned by light, and the associated opto-electronic detector, in order to generate a strip pattern resulting from the light modified by the measuring graduation. In this case the analyser grating is designed in such a way that a straight-line extending strip pattern is generated by the light modified by a circle-shaped measuring graduation, or in the reverse manner a circle-shaped measuring graduation is generated from the light pattern generated by a linear measuring graduation. It is thus possible, for example in the course of scanning a circle-shaped measuring graduation, to generate a strip pattern which is to be received by an opto-electronic detector and extends straight in the same way as the strip pattern customarily generated in the course of scanning a linear measuring graduation. By this it is possible to evaluate the strip patterns from the angle measuring device, on the one hand and, on the other, those from the linear position measuring system by using opto-electronic detectors of the same type.

It is known from U.S. Pat. No. 5,486,923 to utilize a diffraction grating as a wave front-correcting structure in a position measuring system. An opto-electronic angle measuring system is known from U.S. Pat. No. 4,577,101, wherein a circle-shaped measuring graduation is reproduced on a linear opto-electronic detector by using a conical reflector and a cylindrical lens. Note that the entire contents of U.S. Pat. Nos. 5,486,923 and 4,577,101 are incorporated herein by reference.

OBJECT AND SUMMARY OF THE INVENTION

An object of the present invention is based on further improving a position measuring system of the type mentioned at the outset.

This object is attained in accordance with the present invention by the creation of a position measuring system that includes a material measure or scale having a measuring graduation extending along a first line and a scanning device. The scanning device includes a light source that transmits light beams that scan the measuring graduation, wherein the measuring graduation generates modified light from the transmitted light beams and a detector unit that receives the modified light from the measuring graduation. A lens arrangement, arranged between the material measure or scale and the detector unit, the lens arrangement generating a defined image of the measuring graduation on the detector unit, wherein the defined image extends along a second line, whose curvature is different from a curvature of the first line.

In accordance with this, the lens arrangement of the position measuring system used for generating a defined image of the measuring graduation on the detector unit is embodied in such a way that the generated image extends along a line whose curvature is different from the curvature of that line along which the measuring graduation extends. It is thus possible, for example, to generate a curved image of a linearly extending measuring graduation on the detector unit, or from a curved measuring graduation a linearly extending image, or a representation with a curvature which differs from the other, first mentioned curvature.

Accordingly, the attainment of the object in accordance with the present invention provides the use of a lens arrangement for modifying the curvature of the image with respect to the curvature of the measuring graduation (wherein a straight-line measuring graduation is also contained as a graduation of infinite curvature in this general formulation), so as to generate an image with the same curvature from measuring graduations of different curvature, so that the images from different measuring graduations can be evaluated by a detector unit of one single type.

The attainment of the object in accordance with the present invention is particularly suited for position measuring systems with a linearly extending measuring graduation (so-called linear measuring systems), or for position measuring systems with a measuring graduation extending along a ring, in particular a circle, i.e. so-called angle measuring systems. In this case the latter need not extend along the entire circumference of the ring, or circle, instead it is possible to constitute an appropriate measuring graduation also by a segment of an angle merely extending along a section of a ring, or circle.

Independently of whether a ring-like extending measuring graduation forms a ring, or only a section of a ring, such a measuring graduation is constituted by ring segments arranged one behind the other in a ring shape, each of which has a defined extension in the radial direction, and whose width (extension in the circumferential direction of the ring) varies in the radial direction, namely increases outward in the radial direction. For producing a straight extending image of a ring-shaped measuring graduation, each of the images of the individual ring segments of the measuring graduation formed by the lens arrangement on the detector unit must be of a constant width, i.e. a constant extension along the linear extension direction of the image. For this purpose it can be provided that the image magnification of the lens arrangement is varied in the radial direction—in reference to the center axis of the ring along which the measuring graduation extends over the complete circumference or only over sections—namely decreases in the radial direction from the inside to the outside from a value of greater than 1 to a value of less than 1. This can be achieved, for example, in that the image magnification is reversely proportional to the distance of a point on the measuring graduation from the center axis of the measuring graduation. The latter is made possible in that the focal lengths of the individual lenses of the lens arrangement vary in the radial direction with respect to the center axis of the measuring graduation.

In the opposite way it is possible to form a curved, ring-shaped image from a linearly extending measuring graduation constituted by lines arranged one behind the other along a straight line (segments of constant width), in that the image magnification of a ring-shaped lens arrangement varies in the radial direction in reference to the center axis of the lens arrangement, in particular increases outward in the radial direction from a value of less than 1 to a value of greater than 1.

A lens arrangement is particularly suited for generating images of the type mentioned above from a measuring graduation, which includes two groups of lenses, each of which is arranged in one of two planes extending parallel with each other, wherein the planes are oriented in such a way that the light beams modified by the measuring graduation intersect the planes.

In this case, a lens from one group is combined with a lens from the other group so that the pair of lenses form a cell, and the lenses of a cell are each arranged one behind the other perpendicularly with respect to the two planes in such a way that at least a portion of the light beams which pass through a first lens of a cell thereafter reach the second lens of the same cell and not a second lens of a different cell of the lens arrangement. Cross talk between the various cells of the lens arrangement is intended to be avoided by this.

Alternatively or additionally, for preventing cross talk a screen can be used, which is arranged between the two lens groups or in the plane of the lens group through which the light beams pass last. In this case an opening in the screen structure can be assigned in particular to each cell of the lens arrangement. The light beams can be conducted by such a screen structure in such a way that those light beams which have passed through a first lens of a cell of the lens arrangement do not reach a second lens of another cell of the lens arrangement.

Preferably the two lens groups are each arranged parallel with the scale and parallel with the light-sensitive surface of the scanning device. Each preferably includes lenses arranged one behind the other in a ring shape (ring segment-like), wherein the centers of the two lens groups are located on a straight line (common axis) or on a segment of a circle.

It can furthermore be provided that the lens centers of the individual lenses of the two lens groups are arranged in a two-dimensional grid including several lines, or that each of the lens centers is located along several concentric circle lines of different radii.

In this case the lines of the two-dimensional grid can extend substantially parallel with the extension direction of the measuring graduation, and the various lines can be arranged offset with respect to each other in the extension direction of the measuring graduation, and furthermore the centers of the various lines of the circles can be arranged offset with respect to each other in an azimuthal direction.

The lenses themselves are preferably locally embodied as cylinder lenses with a definitely oriented vertex line, they can be cylindrically symmetrical lenses in particular.

In accordance with a preferred embodiment of the present invention, the individual lenses of a group of the lens arrangement are each arched perpendicularly with respect to the extension plane of the respective lens group, wherein the vertex lines of the lenses extend in the radial direction and intersect at a point.

In this case the intersections of the vertex lines of the two lens groups can be spaced apart from each other in the radial direction in such a way that in one cell of the lens arrangement the vertex lines of the two lenses of this cell—viewed along the optical axis—are each located congruently one behind the other, and that in the further cells of the lens arrangement the vertex lines of the two lenses are respectively offset from each other perpendicularly with the optical axis. Because of this the individual ring segments of a ring-shaped measuring graduation which, because of the selected, position-dependent image magnification, are converted into rectangular segments of constant width, can be arranged in the first image plane one behind the other without overlap along a straight line.

To this end it has been furthermore provided that the vertex lines of the lenses of one cell which are offset with respect to each other—viewed along the optical axis—cross in such a way that the intersections of the vertex lines of the first lens group, as well as of the second lens group, are offset with respect to each other in the radial direction. At the same time the lateral boundary lines which delimit the individual lenses of a ring-shaped lens group in the circumferential direction—viewed along the optical axis—are arranged congruently for both lenses of a cell, so that the two lenses of a cell—viewed along the optical axis—are substantially congruent.

Diffractive lenses (also in the form of a multi-stage diffractive structure), as well as refractive lenses, can be used as optical lenses.

The embodiment in accordance with the present invention of a position measuring system can be used in connection with measuring graduations which can be scanned by the incident light method, as well as with measuring graduations which can be scanned by the transmitted light method. Moreover, the embodiment in accordance with the present invention of a position measuring system can be employed in absolute measuring systems (scale with an absolute code track), as well as in incremental measuring systems (scale with a periodic measuring graduation).

The scale can have a plurality of tracks which are arranged next to each other and perpendicularly with respect to their extension direction, and can be scanned by light for position measuring. In this case at least a portion of the tracks can be displayed by a common lens arrangement and/or at least a portion of the tracks can be displayed by separate lens arrangements. Each of the two lens groups of each lens arrangement can here be arranged on a common substrate.

Further characteristics and advantages of the present invention will become clear in the course of the subsequent description of exemplary embodiments by the drawings.

BRIEF DESCRIPTION OF THE DRAWINGS

FIG. 8 shows a modification of the transformation in FIG. 2a.

DETAILED DESCRIPTION OF THE PREFERRED EMBODIMENTS

Figure 1:
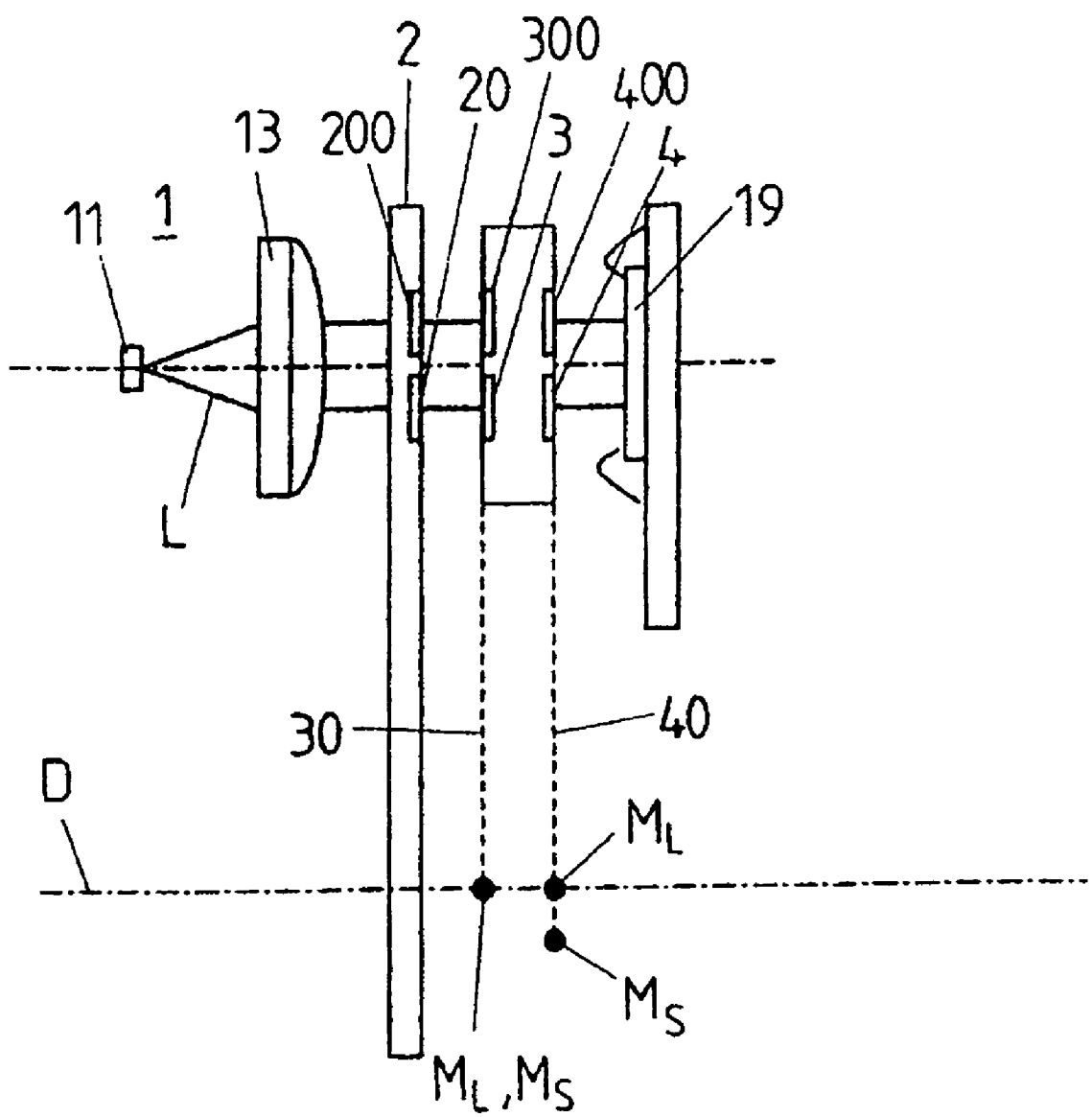
FIG. 1 shows a cross section through an embodiment of a position measuring system for angle measurements in accordance with the present invention, having a code track which can be optically scanned by the transmitted light method and extends in a ring shape, as well as a lens arrangement for displaying the light modified by the code track on an opto-electronic detector.

FIG. 1 shows a position measuring system for angle measurements (i.e. an angle measuring device or angle encoder), having a scale 2 and a scanning unit 1 which, for scanning the scale 2, can be moved along in the measuring direction, i.e. along a circular ring, relative to the scale 2. In this case the scale 2 is embodied as a graduated disk of an absolute angle encoder, and has a measuring graduation in the form of a code track 20 with absolute position information, which extends in the form of a circle on the scale 2 around the axis of rotation D for the relative movement between the scanning unit 1 and the scale 2.

Viewed in the radial direction, an incremental track 200 is provided next to the code track 20 with the absolute position information, which also extends in a ring shape around the axis of rotation D of the position measuring system and is constituted by a periodic line graduation. If required, the scale 2 can have further tracks.

The scanning unit 1 employed for scanning the two tracks 20, 200 of the scale by the transmitted light method has a light source in the form of a light-emitting diode, as well as a photo-electric detector 19 on the side of the scale 2 facing away from the light source. A condenser lens 13 is arranged between the light source 11 and the scale 2, which parallelizes the light beams L emitted by the light source 11 before they impinge on the scale 2. Two lens arrangements 3, 4 and 300, 400 are arranged on the other side of the scale 2 between the scale 2 and the photo-electric detector 19, which are used for generating an image of the light beams L, modified by the code track 20, or the incremental track 200, on the photo-electric detector 19.

In the position measuring system operated by the transmitted light method in accordance with FIG. 1, the light emitted by the light source 11 and parallelized by the condenser lens 13 is modified in the course of penetrating the transparent scale 2 by the code track 20 or by the incremental track 200, in the course of which a defined light pattern is generated. The light modified by the code track 20 or by the incremental track 200 subsequently reaches the first lens arrangement 3, 4, or the second lens arrangement 300, 400, which are arranged on a common substrate. Each of the lens arrangements 3, 4 is constituted by two groups of lenses, which are respectively arranged in one of two planes 30, 40 extending parallel with each other. Each one of the lens groups 3 or 4 or 300 or 400 includes a plurality of lenses arranged next to each other in the respective planes 30 or 40 (a so-called micro lens array). The planes in which the lens groups 3, 4 or 300, 400 of the two lens arrangements extend are arranged in such a way that they are intersected substantially perpendicularly by the light beams L modified at the scale 2.

With such a double lens array including of two lens groups 3, 4 or 300, 400, arranged at a defined distance from and parallel with each other, each individual lens from a first lens group 3, or 300, can have an individual lens from the second lens group 4, or 400, exactly assigned to it. Because of this it is possible with lenses without a waveguide structure to realize a positive image magnification, i.e. an image magnification of a value greater than zero, in particular than the value one. In turn, such an image magnification makes it possible to continuously connect the image ranges of the individual lenses with each other with a defined spatial orientation. This allows the large area scanning of the scale 2, simultaneously along with a low structural height, and therefore a compact design of the position measuring system.

In this connection an embodiment arrangement of the lens arrangement is particularly advantageous in which the image magnification assumes the mean value of one. Because the same grid, i.e., a corresponding arrangement of the individual lenses in the respective planes 30, 40, is used for both lens groups 3, 4, or 300, 400 of the respective lens arrangement, the image areas (correspondingly arranged) of the image created by the lens arrangement 3, 4 on the detector 19 transition directly and continuously into each other.

A special feature of the position measuring system represented in FIG. 1 lies in that the photo-electric detector 19 does not have a circularly structured surface, but instead has a linear, straight structured sensor face such as is used with so-called linear measuring systems, i.e. with position measuring systems with a linearly extending measuring graduation (in the form of a code track or an incremental track). This means that the photo-electric detector 19 is formed by an opto-ASIC which, with its linearly structured surface is primarily employed in linear measuring systems. Since such an ASIC is additionally also used with angle measuring systems, or angle encoders, it can be produced correspondingly cost-effectively in large numbers. This reduces the production costs for position measuring systems.

For using a linearly structured photo-electric detector 19 in a position measuring system for angle measurements in accordance with FIG. 1 it is necessary to generate a linearly extending image on the photo-electric detector 19 from the light pattern created by the circular ring-shaped code track 20, or the circular ring-shaped incremental track 200, which will be explained in what follows with the aid of FIGS. 2a and 2b, as well as FIGS. 3a and 3b. A suitable embodiment of the lens arrangements 3, 4 or 300, 400 is used for this.

Figure 2A:
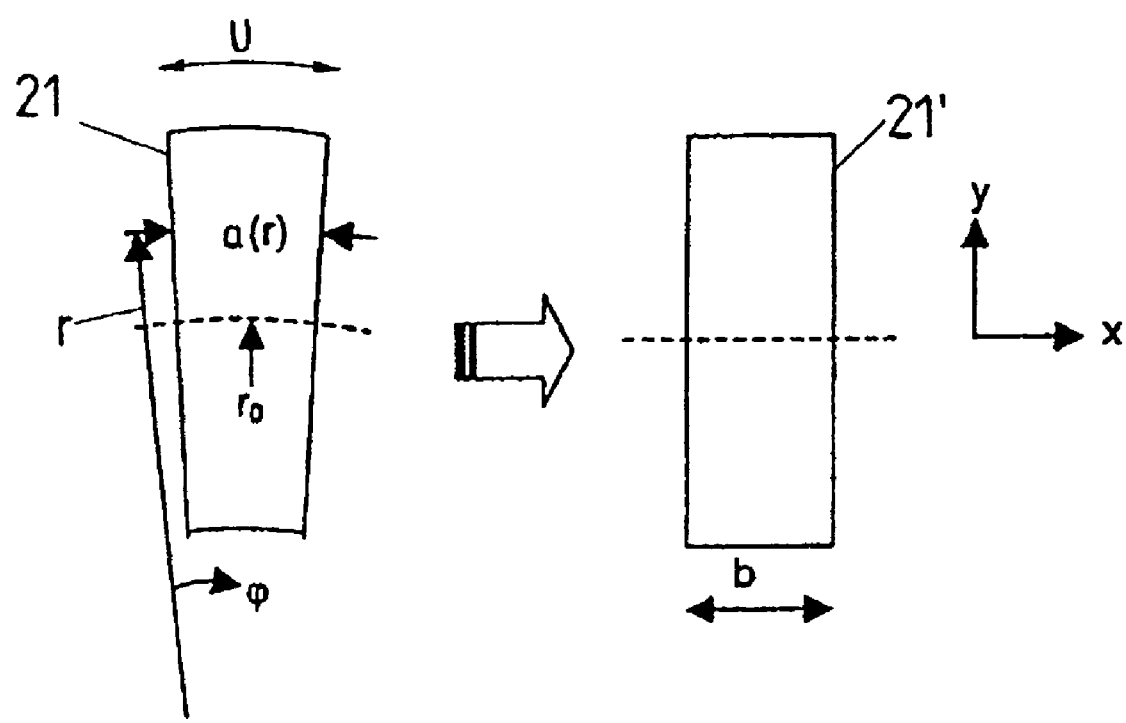
FIG. 2a represents a ring segment of an embodiment of the code track in FIG. 1, as well as the image of this ring segment.

FIG. 2a shows a ring segment 21 of the ring-shaped code track 20 from FIG. 1. For forming a ring-shaped code track 20, the dimension a(r) of each ring segment 21 in the circumferential direction U of the code track 20 is a function of the distance r from the axis of rotation D of the position measuring system.

To create a linearly extending image of a code track consisting of ring segments 21 in accordance with FIG. 2a it is necessary to transform the individual ring segments 21 into rectangular-shaped images 21' of a width b which is independent of their location, as represented in FIG. 2a. In this case the image magnification is selected in such a way that the width b of the rectangular-shaped image 21' of a ring segment 21 corresponds to the width $a(r_0)$ of the ring segment at the radius $r_0$ which, viewed in the radial direction r, defines the center of the ring segment 21. Expressed in other words, the value $r_0$ is selected such that, starting with the value $r_0$, the ring segments 21 extend inward and outward (i.e. away from the axis of rotation D and toward the axis of rotation D) in the radial direction by the same amount. Thus, the points at the distance $r_0$ from the axis of rotation D denote the curved center line of the ring segments 21, and therefore of the code tracks 20 as a whole.

For creating a rectangular-shaped image 21' from a ring segment 21 in accordance with FIG. 2a, an image is used here in which the areas of the ring segment 21, which are located inside the center line defined by the radius value $r_0$, are widened, while those areas of the respective ring element 21, which are located outside of the center line defined by the radius value $r_0$, are reduced in their dimensions a(r). The dimension $a(r_0)$ of the ring segment 21 on the center line itself, defined by the mean radius $r_0$ is to remain unchanged in the transformation, i.e. it should correspond to the width b of the rectangular-shaped image 21' created by the transformation. This corresponds to an image with a radius-dependent scale which fluctuates around a mean value 1 as a function of the radius. The image magnification $\beta(r)=r_0/r$ is particularly suitable for the transformation of the ring segments of a circular ring to a rectangular-shaped image. It is of course possible to use a different reference line than the center line defined by the mean radius $r_0$ for the transformation. However, in what follows the mean radius $r_0$ of the ring segment will continue to be used as the reference point.

In fact, the actual radius-dependent variation of the image magnification $\beta(r)$ is very small. At a typical track radius (corresponding to the mean distance $r_0$ of the ring segments 21 from the axis of rotation D) of $r_0=20$ mm, and a track height (corresponding to the radial extension of the ring segments 21) of 1 mm, the image magnification $\beta(r)$ varies between 0.975 and 1.025.

FIG. 2b again shows a ring segment 21, which extends in the radial direction r from an inner radius $r_1$ as far as to an outer radius $r_2$ and has a mean radius $r_0$, and which has a variable, radius-dependent width in the circumferential direction U of the respective circular ring. All points of this ring segment 21 can be defined by a position vector $r=r(r,\phi)$, i.e. each position vector r of a ring segment 21 is represented by the radius r, as well as by the angular position $\phi$ of the respective point. If the angle on which the bisecting line of an angle of the ring segment 21 extending in the radial direction is located (i.e. that the ring element 21 extends from the bisecting line of this angle in the circumferential direction U in a clockwise, as well as in a counterclockwise direction each by an identical amount $\delta\phi/2$), each position vector r can be described as follows:

$$r=r(r,\phi)=r(r,\phi-\phi_0+\phi_0)$$

For reproducing a ring segment 21 described by the above position vectors r on a rectangular-shaped image 21' of a constant width b, all points of the ring segment 21 each extending in the radial direction, must be transformed into two parallel boundary lines with a constant distance b. A corresponding transformation from a point r of the ring segment 21 to a point r' of the rectangular-shaped image 21' is represented in FIG. 2b. This transformation can be expressed as:

$$r(r,\phi)=r(r,\phi-\phi_0+\phi_0)\rightarrow r'(r,\phi)=r(r,(\phi-\phi_0)*(r_0/r)+\phi_0).$$

Here, r and $\phi$ identify the coordinates of a respective point r or r' of the ring segment 21 or the image 21', and $\phi_0$ defines the angular position of the radially extending center line of the ring segment 21, as well as of the image 21', i.e. the bisecting angle line remains unchanged during the transformation, the same as the points r of the mean radius value $r=r_0$.

The transformation takes place while maintaining the radius value r, i.e. takes place tangentially, in that angles which were $(\phi-\phi_0)$ in the ring segment 21, are reduced/increased at the radius value r to angular values of $(\phi-\phi_0)*(r_0/r)$ in the image 21', depending on whether $r>r_0$ or $r<r_0$.

With $(\phi-\phi_0)=\pm\delta\phi/2$, it would also be possible to write:

$$r(r,\delta\phi/2)=r(r,\pm\delta\phi/2+\phi_0)\rightarrow r'(r(\pm\delta\phi/2)=r(r(\pm\delta\phi/2)*(r_0/r)+\phi_0)$$

In all figures the vector arrows of the vectors r, r', etc. have not been carried through to the axis of rotation D of the position measuring system for reasons of clarity. However, in every case the starting point of the vectors is to be this axis of rotation D.

Each position vector r of the ring segment is therefore represented by the coordinates r and $\phi$, wherein r defines the radial distance of the respective point from the axis of rotation D of the position measuring system, and $\phi$ the angle in the circumferential direction.

Figure 2B:
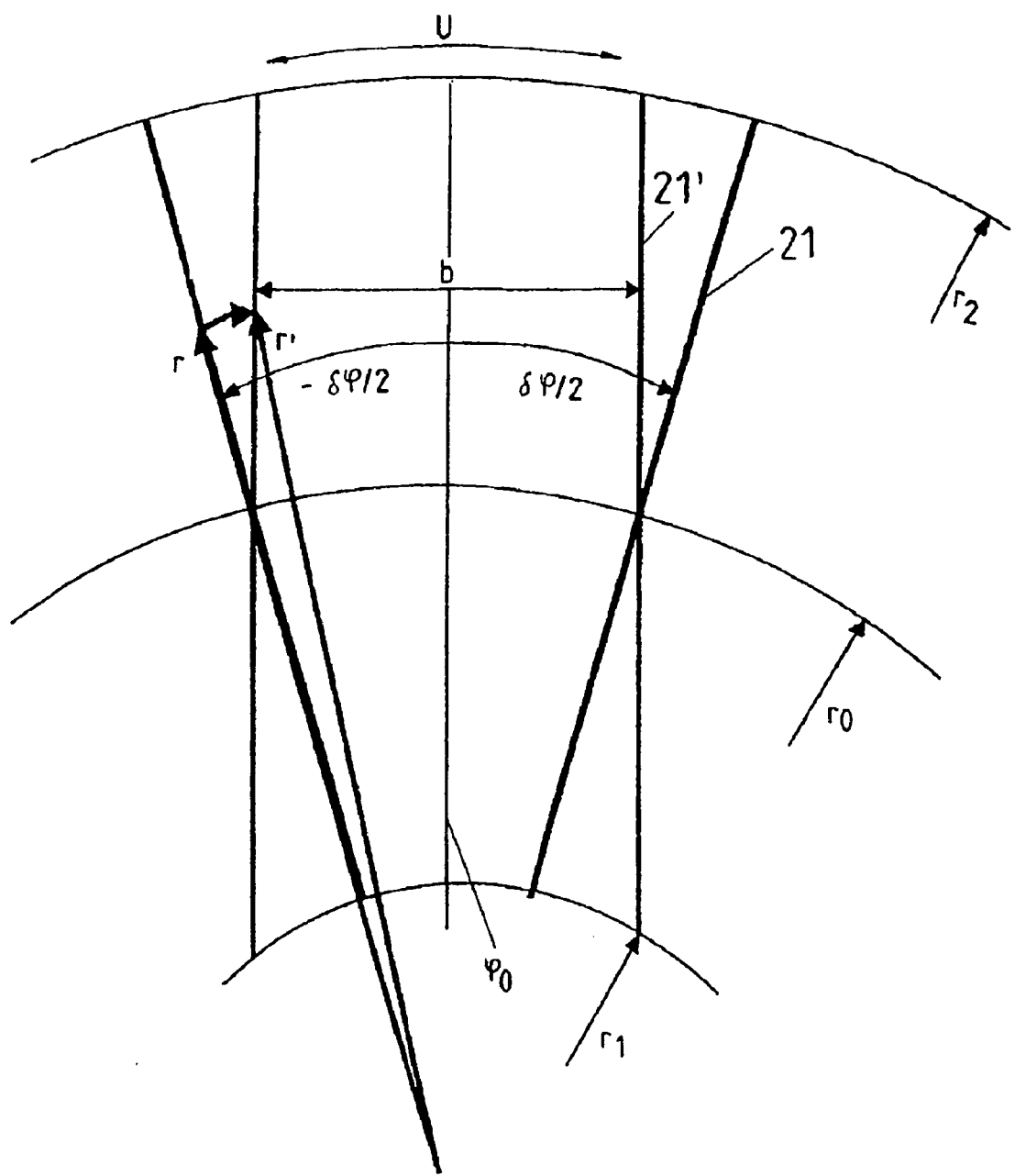
FIG. 2b shows a further representation of the embodiment of the ring segment from FIG. 1, as well as its image.

Initially, a transformation was explained by means of FIGS. 2a and 2b which each individual ring segment 21 of the code track 20 must undergo for generating a linearly extending image on the photo-electric detector 19 (see FIG. 1) from the circular ring-shaped extending code track 20. However, the transformation of the individual ring segments into rectangular-shaped images 21' is not sufficient for creating a linearly extending image of the code track 20 as a whole. To this end it is furthermore necessary to arrange the individual rectangular-shaped images 21' one behind the other in such a way that they adjoin without overlap. This will be explained in what follows by FIGS. 3a to 3d.

Figure 3A:
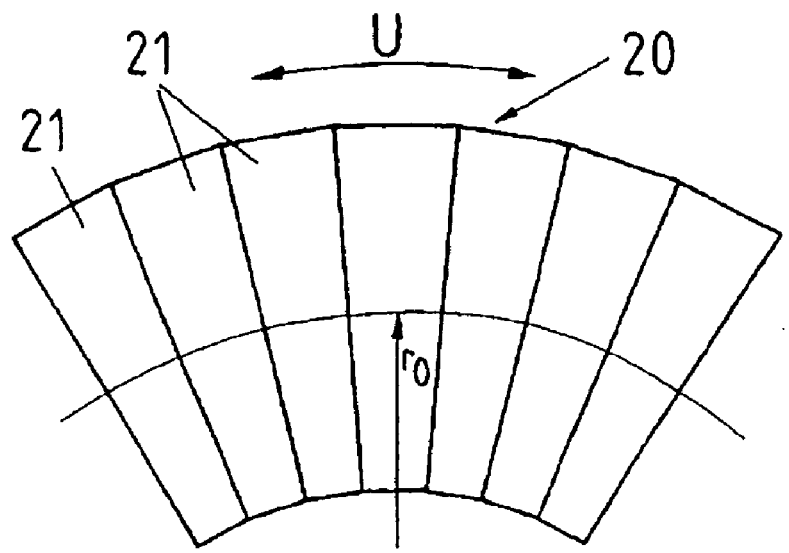
FIG. 3a shows several ring segments of the embodiment of the code track in FIG. 1, arranged next to each other along a circular ring.
Figure 3B:
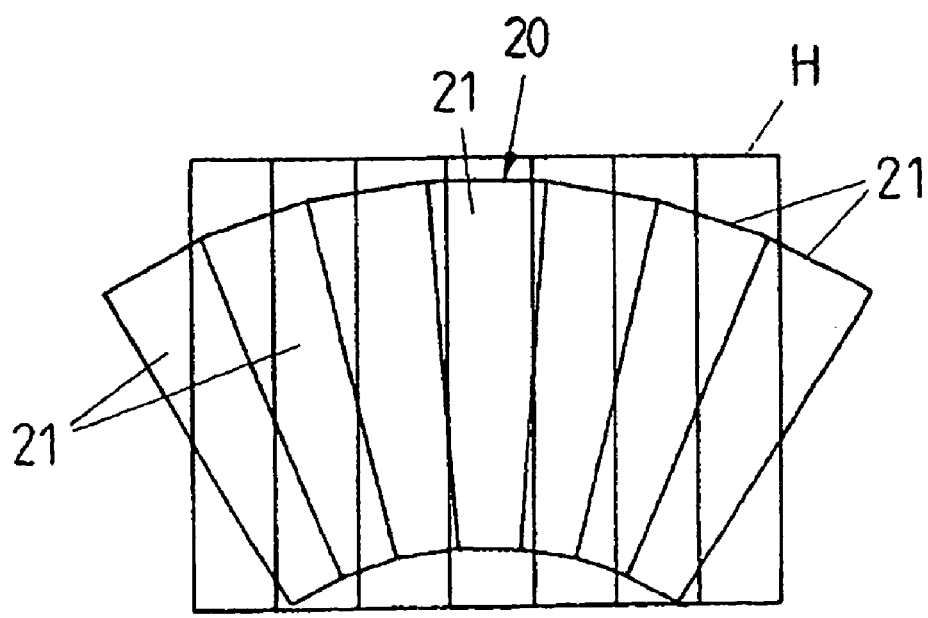
FIGS. 3b to 3d represent possible transformation steps during the creation of an image of the arrangement in FIG. 3a, wherein the image is formed by segments of constant width arranged linearly one behind the other in accordance with the present invention.

FIG. 3a shows several ring segments 21 of the code track 20, which are arranged one behind the other in the circumferential direction U of the code track and each of which has the geometry explained by means of FIGS. 2a and 2b. FIG. 3b again shows the ring segments 21 from FIG. 3a in front of a background grid H with rectangular-shaped grid segments of constant width, in which the individual ring segments 21 must be arranged for creating the desired rectangular-shaped images 21'. The width of the individual grid segments of the background grid H has been selected here in such a way that they correspond to the width b of the ring segments 21 at the height of the track radii $r_0$, corresponding to the association $b=a(r_0)$ already explained by FIG. 2b.

Figure 3C:
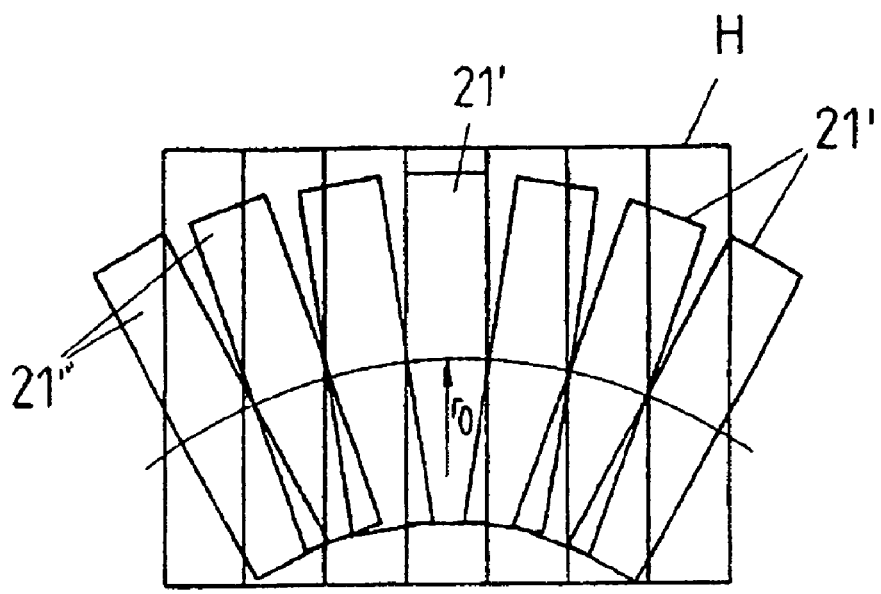

FIG. 3c shows the images 21' of the ring segments 21, which were generated by a transformation of the individual ring segments 21 into rectangular-shaped images 21', in front of the background grid H. It becomes clear from FIG. 3c that the images 21' generated by transformation from the individual ring segments 21 are not arranged linearly one behind the other, but instead angled with respect to each other, and intersect along the track radius $r_0$. Adjoining rectangular-shaped images 21' are each tilted with respect to each other at an angle $\delta\phi$ corresponding to the extension of the angles of the individual ring segments 21 in the circumferential direction U, see FIG. 2b.

Figure 3D:
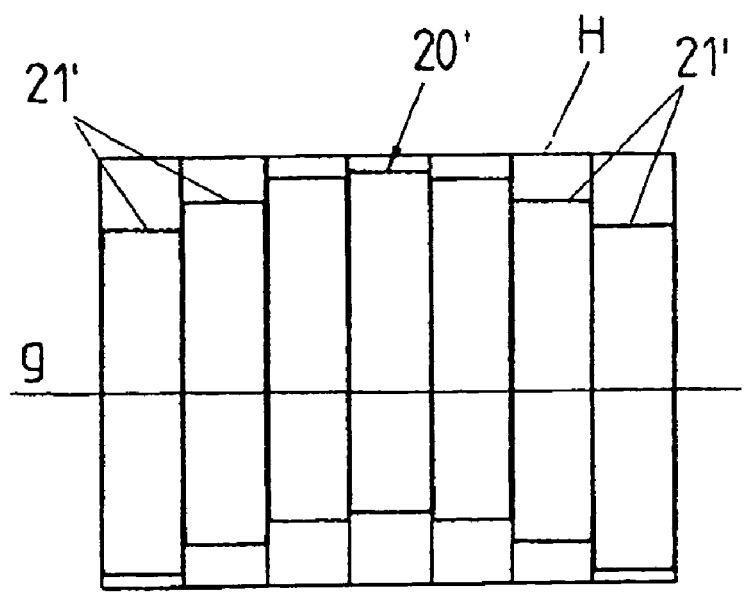

The task now is to tilt the rectangular-shaped images 21' in such a way that they are afterwards arranged linearly one behind the other along a straight line G in the background grid H, see FIG. 3d. For this purpose, one of the rectangular-shaped images 21' is defined as a central, non-tilted rectangle, and all other rectangular-shaped images 21' must be tilted in the amount of a multiple of the tilt angle $\delta\phi$ around their respective centers in such a way that they extend parallel with the central image which is defined as being non-tilted.

The generation of rectangular-shaped images 21' from the ring segments 21, and the subsequent tilting of the images 21' for creating a linear arrangement along a straight line G were represented in FIGS. 3a to 3d as being two separate transformation steps taking place in sequence. Such a transformation will be explained in greater detail in what follows. However, it is also possible in the same way to select a transformation from a ring-shaped code track 20 to a linearly extending image 20', wherein the formation of rectangular-shaped images 21' and the linear arrangement of the images 21' one behind the other are not generated in separate transformation steps, but instead are directly connected. This results from the freedom in the selection of the image which leads from the ring-shaped code track 20 to the linearly extending image 20'.

That the image magnification should be $\beta(r)=r_0/r$ applies to the entire image formation which creates the linearly extending image 20' from the ring-shaped code track 20. The desired generation of rectangular-shaped images 21' from the individual ring segments 21 of the code track 20 can only be achieved with this image magnification. The image magnification $\beta(r)$ is composed multiplicatively by the image magnifications $\beta_1(r)$ and $\beta_2(r)$ of the first or second lens group 3 or 4 of the lens arrangement assigned to the code track. Obviously there are a multitude of possibilities to obtain the image magnification $\beta(r)=r_0/r$ of a total image by the multiplicative linkage of the image magnifications $\beta_1(r)$ and $\beta_2(r)$ of two images. Within the meaning of the exemplary embodiment described by FIGS. 3a to 3d, in what follows $\beta_2(r)=-1$ and, correspondingly $B_1(r)=-r_0/r$ should apply. Therefore, in accordance with FIGS. 3b and 3c, a rectangular-shaped image 21' is already created from each ring segment 21 in the course of the first image formation from the individual segments 21 of the ring-shaped code track 20 by the lens group 3 provided for this, which is arranged in a plane 30. However, in this case there is the tilting of the images 21' with respect to each other, which was explained by FIG. 3c, which can be represented for each rectangular-shaped image 21' as a whole number multiple of the above defined angle $\delta\phi$ in relation to a central reference image 21'. In this case the n-th neighbor of the image 21' defined as being non-tilted has the respective tilt angle $n*\delta\phi$ in relation to it.

So that the second image formation can correct the tilt angle of each rectangular-shaped image 21' to a value zero, the vertex lines of the lenses of the second lens group 4 must meet definite conditions, which will be explained in greater detail in what follows with the help of FIGS. 4a and 4b.

Figure 4A:
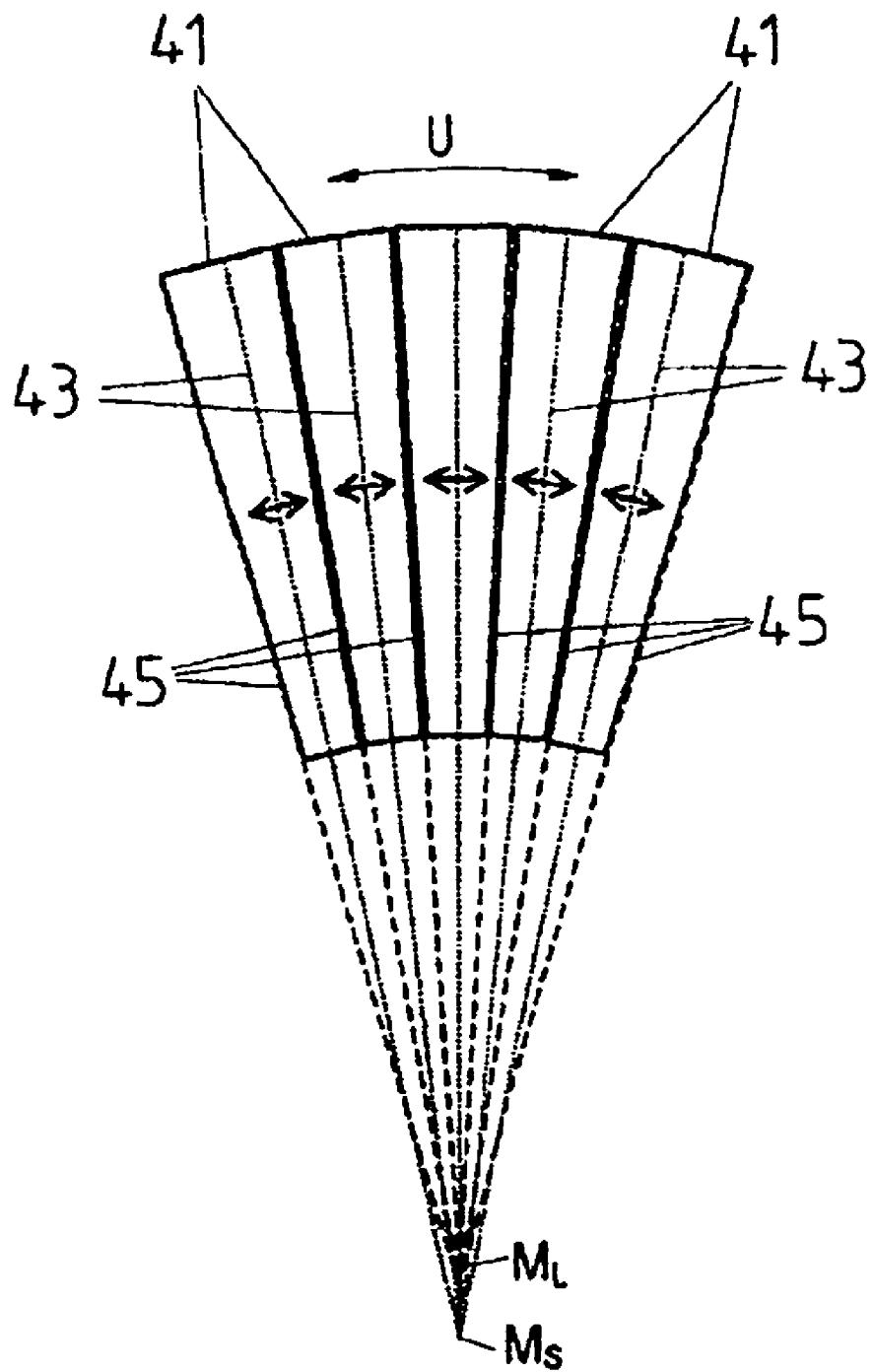
FIG. 4a is a view from above on an embodiment of a lens group of the lens arrangement in FIG. 1.
Figure 4B:
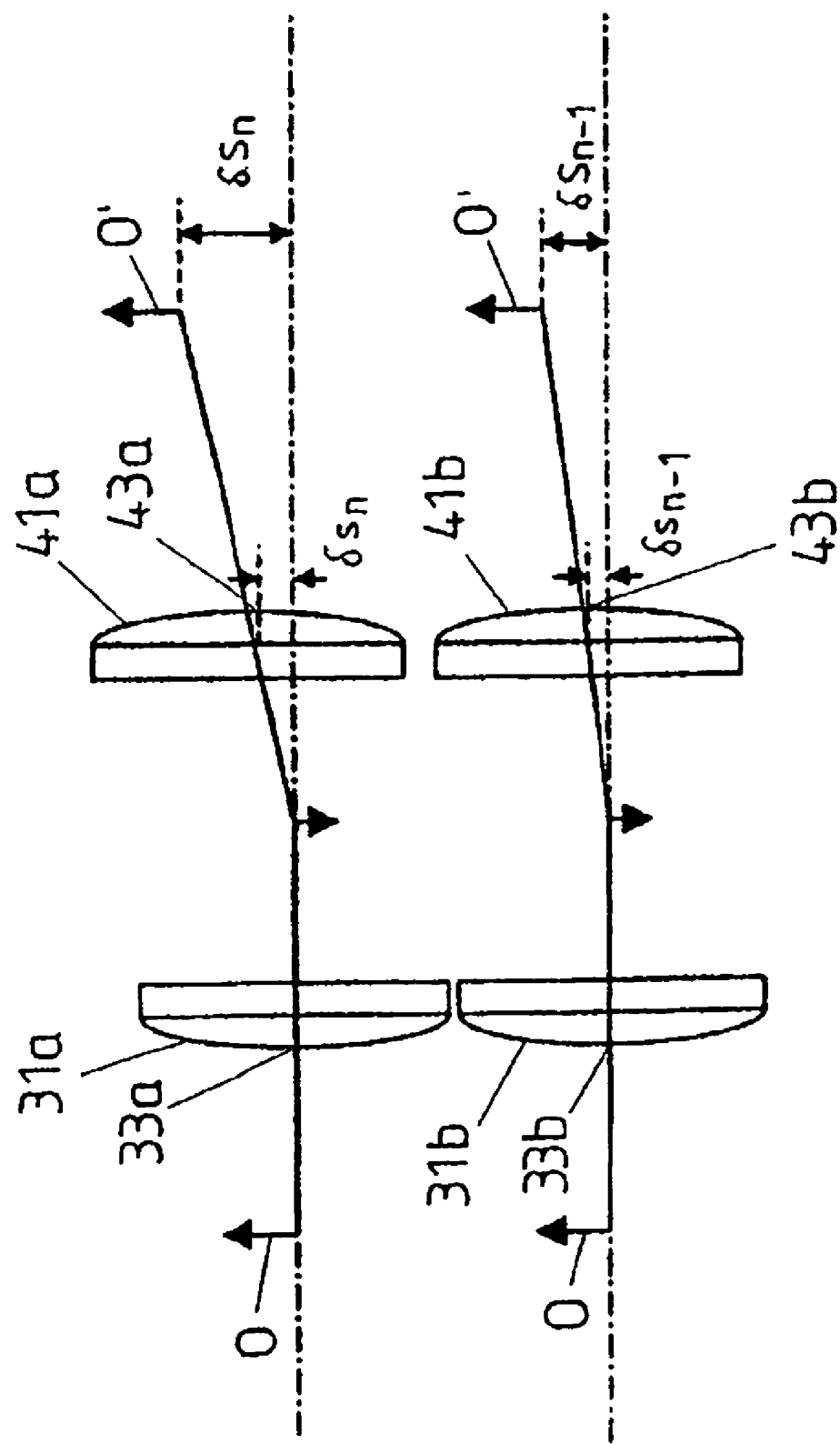
FIG. 4b is a section through the embodiment of the lens arrangement in FIG. 1.

The basis of the following explanations, along with a supplementary reference to FIGS. 4a and 4b, is the problem of how the individual lenses of the two lens groups 3, 4 of the lens arrangement assigned to the code track 20 must be embodied, and how these lenses must be combined into a group in the respective planes 30 or 40, so that the above explained placement of an image of a ring-shaped extending code track 20 on a linear extending image 20' can be performed.

As already explained with the help of FIG. 1, a lens arrangement 3, 4 is used for forming an image of the code track 20 on the photo-electric detector 19, which includes two lens groups (micro lens arrays), each arranged in a plane 30 or 40, preferably arranged perpendicularly in relation to the optical axis and extending parallel with the code carrier 2, and also parallel with the radiation-sensitive surface of the photo-electric detector 19. This parallel arrangement of the individual components of the position measuring system makes assembly easier. For obtaining the desired image magnification $\beta(r)=r_0/r$ in such an arrangement by the known paraxial image equations, it is necessary to determine the positional dependency of the focal lengths $f_1$ and $f_2$ of the first and second image, or of the first lens group 3 and the second lens group 4, i.e., $f_1=f_1(r)$ and $f_2=f_2(r)$. If, as explained above, the positionally-dependent image magnification is realized in particular by the first image, the dependency from the radius r (i.e. the distance from the axis of rotation D) must be taken into consideration, particularly in connection with the focal length f, of the first image.

The image of the structures of the scale 2 preferably takes place only in the graduation direction, i.e. in the direction of extension of the measuring graduation, that is in the circumferential direction U, and in the radial direction r a shadow projection is used instead. In that case the lenses 41 used are similar to cylinder lenses, whose imaging axes are oriented in the circumferential direction U, see the representation of a portion of the second lens group 4 in FIG. 4a. The lenses 41 have a focal length $f_2$, which is a function of the radius r, and are here called modified cylinder lenses. As becomes clear from FIG. 4a, the individual lenses 41 are each embodied as ring segments and are arranged one behind the other along a circumferential direction U. In place of substantially cylinder-shaped lenses it is also possible to use lenses which, in a view from above, are embodied substantially rectangular-shaped, elliptical or radially-symmetrical.

The image-forming directions of the lenses 41 are indicated by arrows in FIG. 4a. The vertex lines 43 of the lenses 41, which arch in a cylinder shape out of the plane, extend perpendicularly with respect to the image direction and meet at a common intersection point $M_S$ located outside of the axis of rotation D, or center axis of the position measuring system, see FIG. 1. The radial boundary lines 45 of the individual lenses 41 also meet at a common center $M_L$, wherein this intersection point $M_L$ coincides with the axis of rotation D, see FIG. 1.

The lenses of the first lens group 3 of the lens arrangement 3, 4 are embodied and arranged in the associated plane 30 in a way corresponding to the lenses 41 of the second lens group 4. These are also modified cylinder lenses, each of which is embodied in a ring segment-like manner, and are arranged side- by-side along a circumferential direction U. The essential difference lies in that in accordance with the present exemplary embodiment in the first lens group 3 the vertex lines of the lenses, as well as the lens boundary lines (transition lines from one lens to the next) intersect in the same point $M_S = M_L$, see FIG. 1.

Care should be taken that in the determination of the focal lengths $f_1(r)$ and $f_2(r)$ always the radial distance from the axis of rotation D of the position measuring system is used, and that this calculation takes place along the vertex line of the respective axis. It is assured by the above mentioned construction specifications for the individual modified cylinder lenses of the two lens groups 3, 4, wherein the focal lengths $f_1(r)$ and $f_2(r)$ must lead to the desired image magnifications $\beta_1(r)$ and $\beta_2(r)$, that each pair of individual lenses of the two lens groups 3, 4, each including a lens of the first lens group 3 and a lens of the second lens group 4, which is arranged behind it along the optical axis, generates an associated corrected partial image of a ring segment 21 of the circular, ring-shaped extending code track 20. But in accordance with FIGS. 3c and 3d, these individual partial images (rectangular-shaped images 21' of the ring segments 21) must be positioned with respect to each other and oriented in such a way that a continuous corrected total image 20' is created, which extends along a straight line. To this end it is necessary to abide by the further construction specifications explained in what follows by means of FIGS. 1 and 4b.

The light beams which, starting at the code track 20, impinge on the vertex lines 33a, 33b of lenses 31a, 31b of the first lens group 3, are not deflected in the circumferential direction U. The deflection in the circumferential direction, which is required for a straight-line arrangement of the images and which is preset by the magnification scale $\beta(r)$ in each radial position r, must be achieved by the offset in the circumferential direction of the vertex lines 43a, 43b of the corresponding lenses 41a, 41b of the second lens group 4.

Two cells 31a, 41a and 31b, 41b of the lens arrangement 3, 4 are represented in FIG. 4b, wherein each cell 31a, 41a or 31b, 41b is composed of a first lens 31a or 31b from the first lens group 3 and a second lens 41a or 41b form the second lens group 4 arranged behind it along the optical axis. Furthermore, in FIG. 4b an object O (representing a portion of the code track to be reproduced) is shown for each one of the cells 31a, 41a, and is reproduced on an image O' via an intermediate image (between the two lenses 31a, 41a, or 31b, 41b of the respective cells).

As will become clear from FIG. 3c, in the present exemplary embodiment the images 21' (intermediate images of the total image) generated by the first image formation at an image magnification $\beta(r) = r_0/r$ for radial distances $r < r_0$ from the axis of rotation D of the position measuring system, are arranged so they overlap each other, while they are arranged spaced apart for radial distances $r > r_0$. Accordingly, in the area below the mean circumferential line $r_0$ (i.e. for $r < r_0$), the intermediate images must be offset to the outside with respect to the non-tilted central reference line in order to achieve a sequencing free of overlaps. Inversely, above the mean circumferential line $r_0$ (i.e. for $r > r_0$), the appropriate areas of the rectangular-shaped intermediate images 21' (see FIG. 3c) must be offset inward toward the central reference image. This means that, for $r < r_0$, the vertex lines 43a, 43b of the lenses 41a, 41b of the second lens group—viewed along the optical axis—must be displaced toward the outside with respect to the corresponding vertex lines 33a, 33b of each of the associated lenses 31a, 31b and, for $r > r_0$, must be offset toward the inside in the circumferential direction. This is achieved in that the vertex lines of the lenses of the second lens group 4 intersect at an intersection point $M_S$, which is spaced apart in the radial direction from the corresponding intersection point $M_S$ of the lenses of the first lens group 3. In the present case, the intersection point $M_S$ of the vertex lines of the first lens group 3 coincides with the intersection point $M_L$ of the boundary lines and with the axis of rotation D of the position measuring system, see FIG. 1. In contrast thereto, the intersection point $M_S$ of the vertex lines of the second lens group 4 is located outside the axis of rotation namely, viewed from the direction of the corresponding lenses of the lens group 4, in the radial direction behind the axis of rotation D. By this it is possible to achieve that the vertex lines 33a, 43a, or 33b, 43b of the lenses 31a, 41a, or 31b, 41b of a cell—viewed along the optical axis—cross each other in a point with the radius $r_0$ corresponding to the above conditions for the displacement of the vertex lines of the lenses of the second lens group 4 with respect to the vertex lines of the first lens group 3 towards the outside or the inside, depending on whether $r < r_0$ or $r > r_0$.

The offset $\delta\phi_n$, or $\delta\phi_{n-1}$ of the vertex lines 43a, 43b of the second lenses 41a, 41b of the respective cell with respect to the vertex lines 33a, 33b of the first lenses 31a, 31b of the respective cell becomes clear from the sectional representation in FIG. 4b through the two cells 31a, 41a and 31b, 41b of the lens arrangement for a defined radius r. For a defined radius r this offset is a function of the distance of the corresponding cell from the cell used for reproducing the intermediate image, which is used as reference segment and is not to be tilted (corresponding to the central intermediate image 21' in FIG. 3c). From this results the corresponding offset of the image O' of an object O of $\delta S_n$, or $\delta S_{n-1}$, perpendicular to the optical axis in relation to the respective object O to be reproduced. By means of this radius-dependent offset of the intermediate images 21' represented in FIG. 3c toward the inside (for large radii) or toward the outside (for small radii), the linear arrangement of the rectangular-shaped images 21' along a straight line g in accordance with FIG. 3d is obtained in the end.

As a result, for the n-th cell of the lens arrangement 3, 4—viewed from the cell by which the central rectangular-shaped intermediate image 21', which is used as reference segment and is not to be tilted (see FIG. 3c), is reproduced—the vertex lines 43a of the second lens 41a extend exactly along the bisecting angle line of $n*\delta\phi$ through the intersection point of the mean circumferential line with $r = r_0$ and the line $\phi = n*\delta\phi$. This is a direct consequence of the image magnification $\beta_2(r) = -1$ for the second image.

If the second image magnification $\beta_2(r) = c$ is based on the value of $c = 1$, the vertex line of the respective second lens would have to extend along a line whose inclination between $0°$ and $n*\delta\phi$ has a ratio of c:1. Should the image magnification $\beta_2(r)$ not be constant (independent of the radius), the vertex line of the second lens would no longer be represented as a straight line, but would extend along a curved line.

Further construction specifications for the lens arrangement relate to the lens boundary lines, see the lens boundary line 45 for the lenses 41 of the second lens group 4 in FIG. 4a. For creating a definite image of the code track 20 on the photo-electric detector 19 it is necessary to prevent cross talk between adjoining cells of the lens arrangement (see FIG. 4b). This means that light beams which initially pass through a first lens 31a of a cell 31a, 41a are intended to subsequently reach the second lens 41a of the same cell, but not a second lens 41b of an adjacent cell 31b, 41b. A displacement of the lens boundary lines 45 (see FIG. 4a) of the lenses 41 of the second lens group in relation to the lenses of the first lens group (corresponding to the previously explained displacement of the vertex lines of the lenses) would even reinforce cross talk. Therefore the lens boundary lines of both lens groups should agree, i.e.— viewed along the optical axis—should lie above each other and in particular should not cross. This means that the intersection points $M_L$ of the lens boundary lines of the first lens group 3 and the second lens group 4 are located on the same level in the radial direction. In the present case both center points $M_L$ are located on the axis of rotation D of the position measuring system. Thus, along the radial direction the intersection points $M_S$ of the vertex lines of the lenses are exclusively offset with respect to each other, but not the intersection points of the lens boundary lines $M_L$. This means that with respect to their outer boundary lines the lenses—viewed along the optical axis, i.e. perpendicularly in relation to the extension plane 30, 40 of the two lens groups 3, 4—are congruent. Differences only exist in the curvature of the lenses of the first and second lens groups 3, 4 out of the respective plane 30, 40, and therefore also in the path of the corresponding vertex lines of the lenses.

Figure 5:
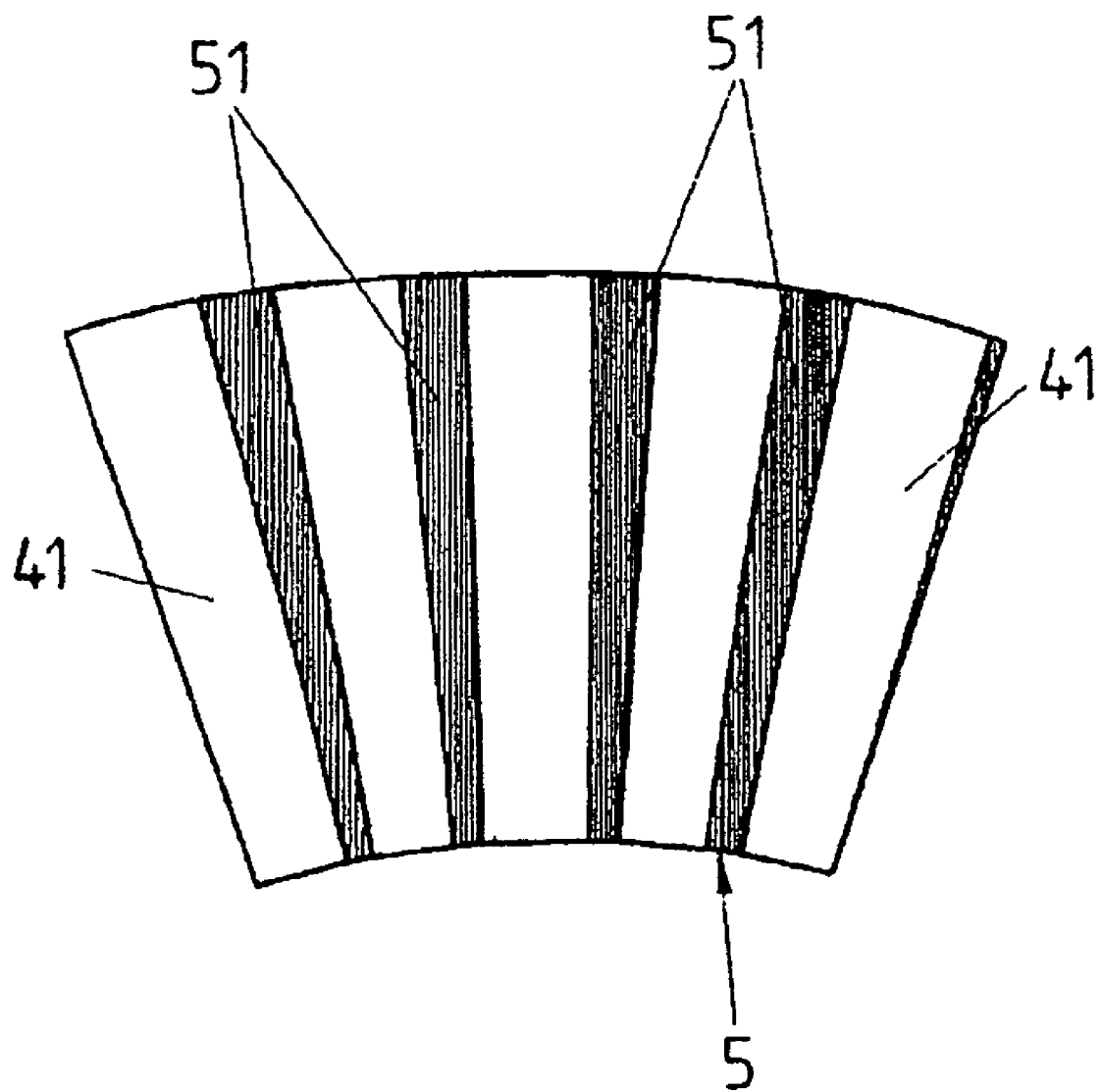
FIG. 5 represents a detail of an embodiment of the lens group of the lens arrangement in FIG. 1 with a screen structure.

In accordance with FIG. 5 it is furthermore possible to provide a screen structure 5 for reducing cross talk, which consists of screen elements 51, each of which is arranged between adjoining individual lenses 41 of the second lens group 4, i.e. covers the radially extending lens boundary lines.

Figure 6:
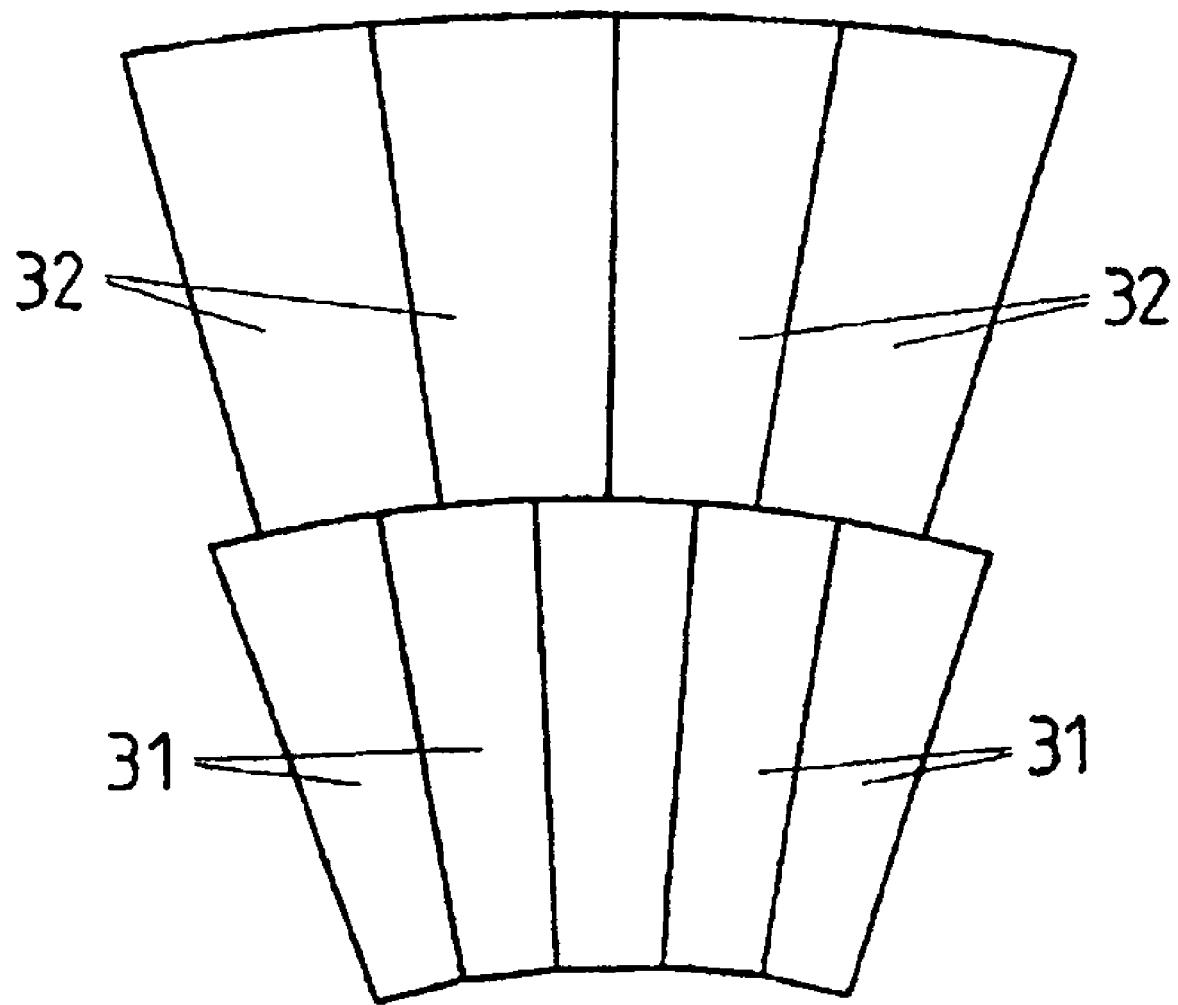
FIG. 6 represents a further embodiment of the lens arrangement to be used with the position measuring system in FIG. 1.

To prevent a reduction in brightness (vignetting) in the area of the lateral lens boundary lines it is possible, as represented by way of example in FIG. 6 in connection with the lenses 31, 32 of the first lens group, to assign lens groups 3, 4 to the code track 20 to be reproduced, each of which includes several ring-shaped micro lens arrays arranged side-by-side in the radial direction and each offset from the other by half an azimuthal lens width, so that the lens centers (centers of gravity) of the individual lenses 31, 32, etc., are arranged along several (in the present case along two) concentric circle lines.

The above described structure of the lens group can be provided with refractive, as well as diffractive lenses. In this case a combination of multi-stage diffractive structures with refractive lenses of low vertex height is also possible, for example by stamping technology. A plastic substrate is preferably used as the support of the lens group.

The measures represented above by a position measuring system operated in accordance with the transmitted light method can be applied in the same way to position measuring systems operated in accordance with the incident light method. In accordance with FIG. 7, with position measuring systems of that type the light L emitted by a light source 11 and parallelized by a condenser lens 13 is reflected at the appropriate code track 20 of the scale 2 and is then reproduced on the photo-electric detector 19 by a lens arrangement including two lens groups 3, 4, wherein the two lens groups 3, 4 are respectively arranged in one of two planes 30, 40, which extend parallel with each other.

Here the illumination of the scale 2 is preferably provided in an axial-radial direction, so that then the reproduction of the respective code track 20 also takes place by parallel projection. Moreover, the mentioned illuminating direction allows a comparatively large amount of freedom in the selection of the area to be illuminated or reproduced. A large object distance of the first image reinforces this advantage.

Narrow illumination angles should be selected for a structure of the arrangement which is as compact as possible, because of which the geometry of the arrangement approaches the extensively discussed transmitted light case. However, a certain offset of identical radii r, r'', etc., arranged one behind the other along the optical axis (in relation to the axis of rotation of the position measuring system), remains, since the optical axis does not extend parallel with the axis of rotation and instead is inclined with respect to it, corresponding to the illumination angle of the parallelized light, which does not fall on the scale 2 perpendicularly, but at an illumination angle differing from the perpendicular line.

Investigations of linear measuring systems (longitudinal measuring systems), wherein a linearly extending measuring graduation is reproduced on a linearly extending photo-electric detector, have shown that an optimum optical image device is achieved if the two lens groups 3, 4 extend parallel with the scale 2 and the radiation-sensitive surface of the photo-electric detector 19. It is to be assumed that this applies in a corresponding way for the case wherein—as here—a measuring graduation 20 extending in a ring shape is reproduced on a linearly extending photo-electric detector 19.

Figure 7:
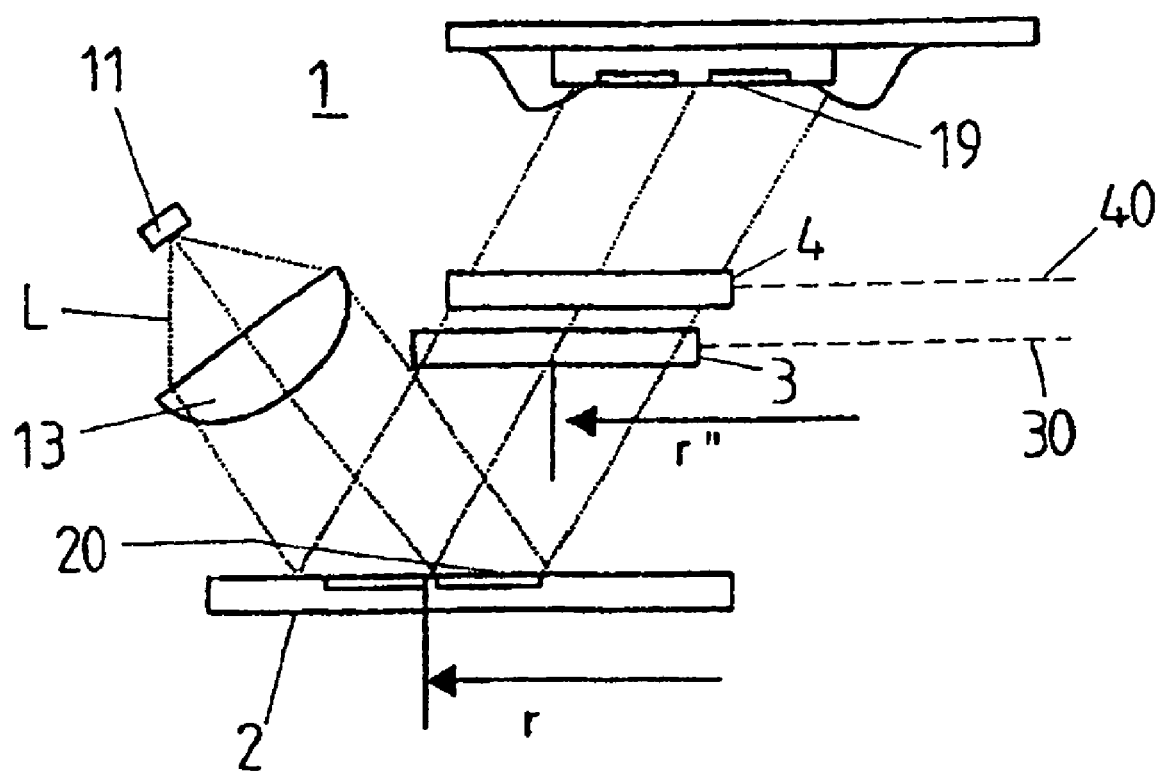
FIG. 7 shows an embodiment of a position measuring system for scanning a measuring graduation by the incident light method.

Accordingly, the measures described above for the transmitted light method by FIGS. 1 to 6 can be employed in a corresponding manner with an arrangement in accordance with FIG. 7, which operates by the incident light method, in particular with respect to the course of the vertex lines and the lateral, radially extending boundary lines of the lenses, wherein in each case the same radius r is ascribed to the points arranged one behind the other along the optical axis, although the optical axis does not extend parallel with the axis of rotation D. The radial coordinates r of the individual points then no longer relate to the distance from the axis of rotation of the position measuring system, but instead to the distance from an artificially defined center axis extending parallel with the optical axis, so that points arranged one behind the other along the optical axis have the same radial coordinate r.

As explained by the transmitted light method, here, too, only the vertex lines and the lens boundary lines are predetermined in connection with the geometry of the lenses, while the curvature of the lenses under the existing conditions of compatibility, in particular in view of the radius-dependent image magnification, are determined by means of an optimizing program (computer program).

Figure 8:
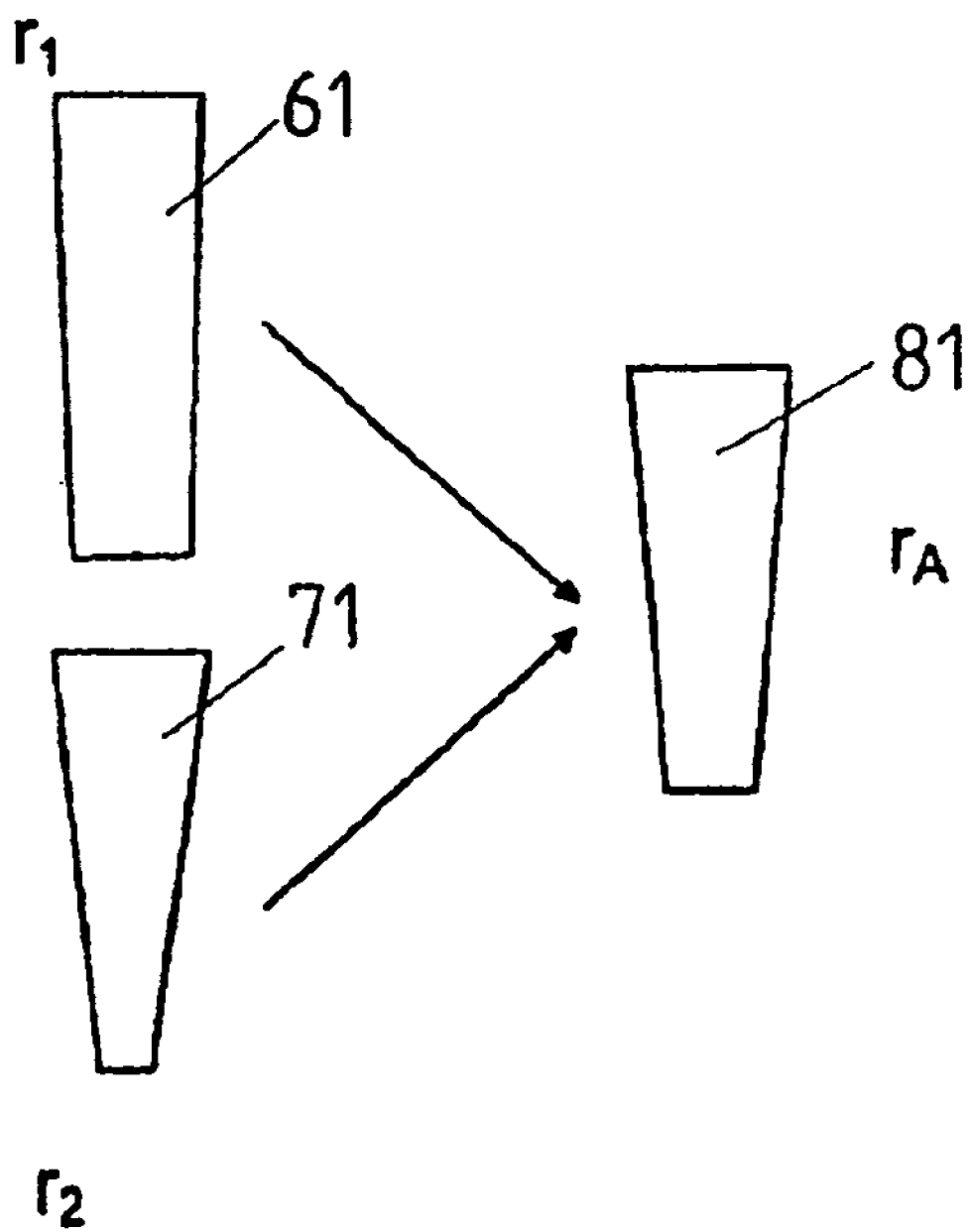

In accordance with FIG. 8, the above described measures can furthermore be used for transforming a measuring graduation extending in a ring shape and having ring segments 61 of a comparatively large radius of curvature $r_1$, or having ring segments 71 of a comparatively small radius of curvature $r_2$, into an image extending in a ring shape, whose segments 81 have a radius of curvature $r_A$ which differs from the measuring graduation to be reproduced. In the case of a measuring graduation with a very large radius of curvature, this allows a reduction of the radius of curvature and, in case of a measuring graduation with a very small radius of curvature it is possible, for example, to achieve an increase of the radius of curvature. To this end, the image magnifications of the two partial images defined by the two lens groups 3, 4 must be selected to be such that not rectangular segments of constant width are generated from the individual ring segments, but instead different, ring-like segments of different curvature.

Finally, in a reversal of the above described measures, it is also possible to transfer a linearly extending measuring graduation in such a way that an image extending in a ring shape is created on the photo-electric detector. For this, too, the image magnifications of the two partial images must be appropriately selected.

Besides the exemplary embodiments described, it is understood that alternative variants also exist within the scope of the present invention.

We claim:

1. A position measuring system, comprising:
    a scale comprising a measuring graduation extending along a first line;
    a scanning device comprising:
       a light source that transmits light beams that scan said measuring graduation, wherein said measuring graduation generates modified light from said transmitted light beams;
       a detector unit that receives said modified light from said measuring graduation; and
    a lens arrangement, arranged between said scale and said detector unit, said lens arrangement generating a defined image of said measuring graduation on said detector unit, wherein said defined image extends along a second line, whose curvature is different from a curvature of said first line; and
    wherein an image magnification of said lens arrangement varies in a radial direction in relation to an axis.

2. The position measuring system in accordance with claim 1, wherein said first line is curved.

3. The position measuring system in accordance with claim 2, wherein said first line is at least a portion of a circle.

4. The position measuring system in accordance with claim 3, wherein said second line is a straight line.

5. The position measuring system in accordance with claim 3, wherein said second line is at least a portion of a second circle.

6. The position measuring system in accordance with claim 1, wherein said lens arrangement comprises optical lenses.

7. The position measuring system in accordance with claim 1, wherein said measuring graduation comprises a plurality of ring segments arranged in a ring shape one behind the other, and each of which has a defined extension in a radial direction.

8. The position measuring system in accordance with claim 7, wherein a width of each of said plurality of ring segments as measured along a circumferential direction of said ring shape, varies in said radial direction.

9. The position measuring system in accordance with claim 8, wherein said width of each of said plurality of ring segments increases outward in said radial direction.

10. The position measuring system in accordance with claim 7, wherein said lens arrangement reproduces images of said plurality of ring segments on said detector unit, wherein each of said images of said plurality of ring segments have a constant width along an extension direction of each of said images.

11. The position measuring system in accordance with claim 10, wherein said lens arrangement has a structure for providing images of said plurality of ring segments that adjoin without overlap.

12. The position measuring system in accordance with claim 7, wherein said lens arrangement reproduces images of said plurality of ring segments on said detector unit, wherein each of said images of said plurality of ring segments are embodied as ring segments whose width as defined along a circumferential direction of said ring shape, varies in said radial direction.

13. The position measuring system in accordance with claim 12, wherein said width of each of said images of said plurality of ring segments increases outward in said radial direction.

14. The position measuring system in accordance with claim 1, wherein said axis is a center axis of said measuring graduation extending along a ring.

15. The position measuring system in accordance with claim 1, wherein said axis is a center axis of said lens arrangement.

16. The position measuring system in accordance with claim 1, wherein said image magnification decreases outward in a radial direction from a value larger than one to a value less than one.

17. The position measuring system in accordance with claim 1, wherein said lens arrangement comprising individual lenses that have focal lengths that vary in a radial direction in relation to an axis of said measuring graduation.

18. The position measuring system in accordance with claim 1, wherein said image magnification increases outward in said radial direction from a value smaller than one to a value larger than one.

19. The position measuring system in accordance with claim 1, wherein said lens arrangement comprises refractive lenses.

20. The position measuring system in accordance with claim 1, wherein said lens arrangement comprises diffractive lenses.

21. The position measuring system in accordance with claim 1, wherein said measuring graduation is scanned by an incident light method.

22. The position measuring system in accordance with claim 1, wherein said scale comprises a plurality of tracks arranged next to each other.

23. A position measuring system, comprising:
    a scale comprising a measuring graduation extending along a first line;
    a scanning device comprising:
       a light source that transmits light beams that scan said measuring graduation, wherein said measuring graduation generates modified light from said transmitted light beams;
       a detector unit that receives said modified light from said measuring graduation; and
    a lens arrangement, arranged between said scale and said detector unit, said lens arrangement generating a defined image of said measuring graduation on said detector unit, wherein said defined image extends along a second line, whose curvature is different from a curvature of said first line;
    wherein said lens arrangement comprises a group of lenses arranged in a plane, wherein said plane is aligned in such a way that said modified light from said measuring graduation intersects said plane.

24. The position measuring system in accordance with claim 23, wherein said lens arrangement comprises a second group of lenses arranged in a second plane that is parallel to said plane.

25. The position measuring system in accordance with claim 24, wherein a first lens of said group of lenses and a second lens of said second group of lenses are combined into a pair of lenses that define a cell, and wherein said first lens and said second lens of said cell are arranged one behind the other perpendicularly to said plane and said second plane, wherein at least a part of said modified light initially passes through said first lens of said cell and subsequently reaches said second lens of said cell.

26. The position measuring system in accordance with claim 25, further comprising a screen structure assigned to said lens arrangement.

27. The position measuring system in accordance with claim 26, wherein said modified light are conducted by said screen structure in such a way that those portions of said modified light which pass through said first lens of said cell do not reach a lens of a second cell.

28. The position measuring system in accordance with claim 25, wherein individual lenses of said group of lenses are arched perpendicularly with respect to said plane, and vertex lines of said individual lenses extend in a radial direction.

29. The position measuring system in accordance with claim 28, wherein said vertex lines intersect at a point.

30. The position measuring system in accordance with claim 29, wherein individual lenses of said second group of lenses have vertex lines that extend in a radial direction and intersect at a second point that is spaced apart from said point in said radial direction.

31. The position measuring system in accordance with claim 30, wherein vertex lines of said first lens and said second lens, as viewed along an optical axis, are arranged congruently one behind the other, and that in a second cell of said lens arrangement that comprises a third lens from said group of lenses and a fourth lens from said second group of lenses vertex lines of said third and fourth lenses are offset with respect to each other perpendicularly with respect to said optical axis.

32. The position measuring system in accordance with claim 25, wherein lateral boundary lines which delimit said first lens and said second lens in a circumferential direction, as viewed along an optical axis, are congruent for said first lens and said second lens of said cell.

33. The position measuring system in accordance with claim 24, further comprising a screen structure assigned to said lens arrangement.

34. The position measuring system in accordance with claim 33, wherein said screen structure is arranged in said second plane containing said second lens group, wherein said modified light passes through said second lens group subsequent to passing through said lens group.

35. The position measuring system in accordance with claim 33, wherein said screen structure is arranged between said lens group and said second lens group.

36. The position measuring system in accordance with claim 24, wherein said group of lenses and said second group of lenses are aligned parallel with each other.

37. The position measuring system in accordance with claim 24, wherein lens centers of individual lenses of said lens group and said second lens group are arranged in a two-dimensional grid comprising several lines.

38. The position measuring system in accordance with claim 37, wherein said several lines substantially extend parallel with an extension direction of said measuring graduation, and each of said several lines are arranged offset with respect to each other in said extension direction.

39. The position measuring system in accordance with claim 24, wherein lens centers of individual lenses of said lens group and said second lens group are located along.

40. The position measuring system in accordance with claim 24, wherein individual lenses of said group of lenses are arched perpendicularly with respect to said plane, and vertex lines of said individual lenses extend in a radial direction.

41. The position measuring system in accordance with claim 40, wherein said vertex lines intersect at a point.

42. The position measuring system in accordance with claim 41, wherein individual lenses of said second group of lenses have vertex lines that extend in a radial direction and intersect at a second point that is spaced apart from said point in said radial direction.

43. The position measuring system in accordance with claim 23, further comprising a screen structure assigned to said lens arrangement several concentric circle lines of different radii.

44. The position measuring system in accordance with claim 23, wherein said group of lenses comprises refractive lenses.

45. The position measuring system in accordance with claim 23, wherein said group of lenses comprises diffractive lenses.

46. The position measuring system in accordance with claim 23, wherein said measuring graduation is scanned by an incident light method.

47. The position measuring system in accordance with claim 23, wherein said scale comprises a plurality of tracks arranged next to each other.

48. The position measuring system in accordance with claim 23, wherein said first line is curved.

49. The position measuring system in accordance with claim 48, wherein said first line is at least a portion of a circle.

50. The position measuring system in accordance with claim 49, wherein said second line is a straight line.

51. The position measuring system in accordance with claim 49, wherein said second line is at least a portion of a second circle.

52. The position measuring system in accordance with claim 23, wherein said lens arrangement comprises optical lenses.

53. The position measuring system in accordance with claim 23, wherein said measuring graduation comprises a plurality of ring segments arranged in a ring shape one behind the other, and each of which has a defined extension in a radial direction.

54. The position measuring system in accordance with claim 53, wherein a width of each of said plurality of ring segments as measured along a circumferential direction of said ring shape, varies in said radial direction.

55. The position measuring system in accordance with claim 54, wherein said width of each of said plurality of ring segments increases outward in said radial direction.

56. The position measuring system in accordance with claim 53, wherein said lens arrangement reproduces images of said plurality of ring segments on said detector unit, wherein each of said images of said plurality of ring segments have a constant width along an extension direction of each of said images.

57. The position measuring system in accordance with claim 53, wherein said lens arrangement reproduces images of said plurality of ring segments on said detector unit, wherein each of said images of said plurality of ring segments are embodied as ring segments whose width as defined along a circumferential direction of said ring shape, varies in said radial direction.

58. The position measuring system in accordance with claim 57, wherein said width of each of said images of said plurality of ring segments increases outward in said radial direction.

* * * * *

UNITED STATES PATENT AND TRADEMARK OFFICE
CERTIFICATE OF CORRECTION

PATENT NO. : 7,164,482 B2 Page 1 of 1
APPLICATION NO. : 10/840812
DATED : January 16, 2007
INVENTOR(S) : Ulrich Benner et al.

It is certified that error appears in the above-identified patent and that said Letters Patent is hereby corrected as shown below:

In column 18, claim 39, line 8, after "are located" replace "along." with --along several concentric circle lines of different radii.--.

In column 18, claim 43, lines 23-24, replace "lens arrangement several concentric circle lines of different radii." with --lens arrangement.--.

Signed and Sealed this

Seventeenth Day of August, 2010

David J. Kappos
*Director of the United States Patent and Trademark Office*